(12) United States Patent  (10) Patent No.: US 8,282,002 B2
Shams  (45) Date of Patent: Oct. 9, 2012

(54) MULTI-BARCODE SCAN PROCESS

(75) Inventor: Khawaja Shams, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 191 days.

(21) Appl. No.: 12/719,711

(22) Filed: Mar. 8, 2010

(65) Prior Publication Data

US 2011/0215146 A1 Sep. 8, 2011

(51) Int. Cl.
*G06K 7/10* (2006.01)
(52) U.S. Cl. .................................. 235/462.07; 235/383
(58) Field of Classification Search ................................
235/462.01–462.49, 383
See application file for complete search history.

(56) References Cited

U.S. PATENT DOCUMENTS

| | | | |
|---|---|---|---|
| 4,679,154 A * | 7/1987 | Blanford | 235/383 |
| 5,189,289 A * | 2/1993 | Watanabe | 235/437 |
| 6,138,914 A | 10/2000 | Campo et al. | |
| 6,687,346 B1 | 2/2004 | Swartz et al. | |
| 6,729,603 B1 * | 5/2004 | McQueen et al. | 235/375 |
| 6,854,656 B2 | 2/2005 | Matsumori | |
| 6,923,375 B2 * | 8/2005 | Stefani | 235/462.01 |
| 6,974,078 B1 | 12/2005 | Simon | |
| 6,975,856 B2 | 12/2005 | Ogasawara | |
| 7,055,737 B1 | 6/2006 | Tobin et al. | |
| 7,363,054 B2 | 4/2008 | Elias et al. | |
| 7,505,785 B2 | 3/2009 | Callaghan et al. | |
| 7,556,203 B2 | 7/2009 | Robinson et al. | |
| 7,575,168 B2 | 8/2009 | Suomela et al. | |
| 2002/0113128 A1 * | 8/2002 | Heske, III | 235/462.25 |
| 2002/0170964 A1 | 11/2002 | Sabella | |
| 2004/0104268 A1 | 6/2004 | Bailey | |
| 2009/0006196 A1 | 1/2009 | Barkan et al. | |
| 2009/0222459 A1 | 9/2009 | Steinberg | |
| 2009/0299506 A1 | 12/2009 | Lydon et al. | |

FOREIGN PATENT DOCUMENTS

| | | |
|---|---|---|
| EP | 0 945 818 B1 | 9/2008 |
| WO | WO 01/61973 A1 | 8/2001 |
| WO | WO 2007/113610 A1 | 10/2007 |

OTHER PUBLICATIONS

John Burke, "Credit card terminals for iPhone," TUAW—The Unofficial Apple Weblog, member of the Weblogs, Inc. Network, Sep. 23, 2009 (Available online at http://www.tuaw.com/2009/09/23/credit-card-terminals-for-iphone/, last visited Dec. 17, 2009).
NeoReader Enterprise and Lavasphere Enterprise Product Brochure, "2D barcode scanning technology tailored to optimize business performance," NeoMedia Technologies, Inc., Atlanta, GA, 2009 (Available online at http://neom.com/readerenterprise-specs.php, last visited Jan. 4, 2010).
Gary Allen, "Exclusive look at Apple's new iPod touch-based EasyPay checkout, " AppleInsider, www.appleinsider.com, Nov. 3, 2009 (Available online at http://www.appleinsider.com/articles/09/11/03/exclusive_look_at_apples_new_ipod_touch_based_easypay_checkout.html, last visited Dec. 16, 2010).

* cited by examiner

*Primary Examiner* — Jamara Franklin
(74) *Attorney, Agent, or Firm* — Novak Druce + Quigg LLP (57) ABSTRACT

Scanning multiple barcodes, storing different code types, in a single scanning operation and automatically recording the data derived from the barcodes. The data can be stored in a form or database having designated locations for each different code type. In some embodiments, the present technology is useful in conducting a retail transaction and facilitates a simplified transaction when the product for purchase has multiple barcodes printed thereon.

21 Claims, 7 Drawing Sheets

MULTI-BARCODE SCAN PROCESS

FIELD

The following relates to scanning visually encoded data tags, and more particularly to receiving scanner data encoded in multiple visually encoded data tags and processing the data.

BACKGROUND

Visually encoded data tags, e.g., barcodes, are capable of compactly representing data, and may be decoded quickly through the use of a scanning device. Such barcodes have become commonplace for tracking products in warehouses, retail stores, online shipping, and many other applications. For example, each product for sale in a large retail store most likely contains a UPC-type barcode printed on the product or product package. When a customer selects an item for purchase, a retail sales associate may scan the barcode on the product which allows an associated cash register to process the barcode information and output a price for the customer to pay. Additionally, the process of scanning the barcode saves the sales associate the time of manually inputting a product identification value into the cash register for each product being purchased, thus promoting efficiency and reducing human error.

Many products contain one barcode, which is usually located on the product or product package for use by the retail store as described above. However, newer products emerging over the last several years are beginning to require two or more barcodes. For example, in addition to the traditional product-identification codes that are usually encoded into UPC-type barcodes used for sales purposes, other codes such as International Mobile Equipment Identity ("IMEI") codes and Integrated Circuit Card ID ("ICCID") codes are also used to sell mobile phones and they too are encoded into barcodes. The IMEI code can be a unique 17 or 15-digit code used to identify an individual mobile device to a GSM or UMTS network, and the ICCID code can be the 19 or 20 digit serial number of the SIM card contained within the device. When these products are sold in the retail setting, a sales associate must scan each of the barcodes individually, one at a time as prompted, for the sales transaction to be complete.

Scanning two or more barcodes for each product being purchased during a sales transaction results in increased time to complete the transaction, thus decreasing the number of sales that may be completed in a given timeframe by a single sales associate and further decreasing overall efficiency. Further, each sales associate is required to be familiar with the barcode-types that are used in the sales environment so that they can scan the correct barcode when prompted by the cash register. This inevitably leads to human error, which must be accounted for by an error correction scheme in the cash register, and thus more time is wasted. Further, for marketing reasons as well as for conservation of shelf-space, many products are packaged in small boxes requiring even smaller barcodes placed closely together, and making it even more difficult for a sales associate to scan the barcodes.

SUMMARY

The following relates to methods and systems for scanning two or more images visually encoded to have different types of codes encoded therein, in a single scanning operation, and processing the codes. In some embodiments, the present technology is particularly useful in the retail environment, wherein some products now have multiple barcodes which must be scanned to complete the transaction.

In some embodiments, a handheld communication device can receive data decoded from two or more barcodes, each barcode representing data of a different code type. The two or more barcodes having been scanned during a single scanning operation.

A scanning operation can be a characterized by a period of time the barcode scanner remains active to scan barcodes. In some instances, a scanning operation also refers to a period of time the barcode scanner remains active to scan barcodes without receiving a command to restart the scan process. In some embodiments, the scanning operation is coincident with a continuous period in which a scanner button is depressed to activate the barcode scanner. In some embodiments, a scanning operation refers to a pass of the barcode scanner over two or more barcodes.

After the scanning operation, the handheld communication device can identify the code type associated with the barcodes from the received data. For example, in the purchase of a mobile telephone (one type of handheld communication device), a product package often includes a UPC code, IMEI code, ICC ID code and a serial number, each encoded into a barcode. The barcode scanner can scan and decode each of these barcodes and the handheld communication device can identify each code. In some embodiments, this identification is done by a pattern matching technique. In some embodiments, this identification can match each code to a recognized code according to the number of alphanumerical characters expected in the recognized code.

In some embodiments, one code is identified at a time, starting with a first code and continuing through the nth code, wherein n is any number greater than 1.

The identified code can be used to populate a form having fields reserved for the identified code types. Any codes that are not recognized, or that do not have a field reserved for them can be discarded.

A system including a scanning device and processor for scanning multiple barcodes during the same scanning operation and for processing the barcodes to populate a form is also disclosed. In some embodiments, the form can be hosted on a handheld communication device. In some embodiments, the form can be hosted on a server.

A method of conducting a retail sales transaction wherein a product to be sold requires scanning of multiple barcodes is also disclosed. In such embodiments, a scanning device can be operated to read multiple barcodes in a single pass of the scanning device. At least two of the multiple barcodes represents data of different code types. From the scanned and read data, a sales form can be automatically populated.

In some embodiments, the method can be used in conjunction with a handheld communication device having a touchscreen. The touchscreen can be used to accept a touch input that is effective to start operation of the scanner. In some embodiments, a button on the scanning device is effective to start operation on the scanner when the button is activated.

In some embodiments, an audible confirmation tone can be generated as each of the plurality of barcodes is scanned. The audible confirmation can alert the user to the number of barcodes successfully scanned so that the user can be alerted to whether the scan was successful. In some embodiments, a user can know if the scanning operation was not successful because a portion of the sales form can be displayed if the fields in the form are not populated by the scanned barcode data. If any of the fields remain unpopulated, the sales form can be displayed so that the user can learn of the missing information. Alternatively, if all the fields are successfully filled, the sales transaction can move to the next step without displaying that portion of the sales form to the user.

DESCRIPTION

The present technology is applied to encoded data tags, and more particularly, relates to methods, devices and computer program products that provide for scanning and decoding multiple encoded data tags and processing the data to populate a sales form with data encoded in the multiple data tags.

Figure 1:
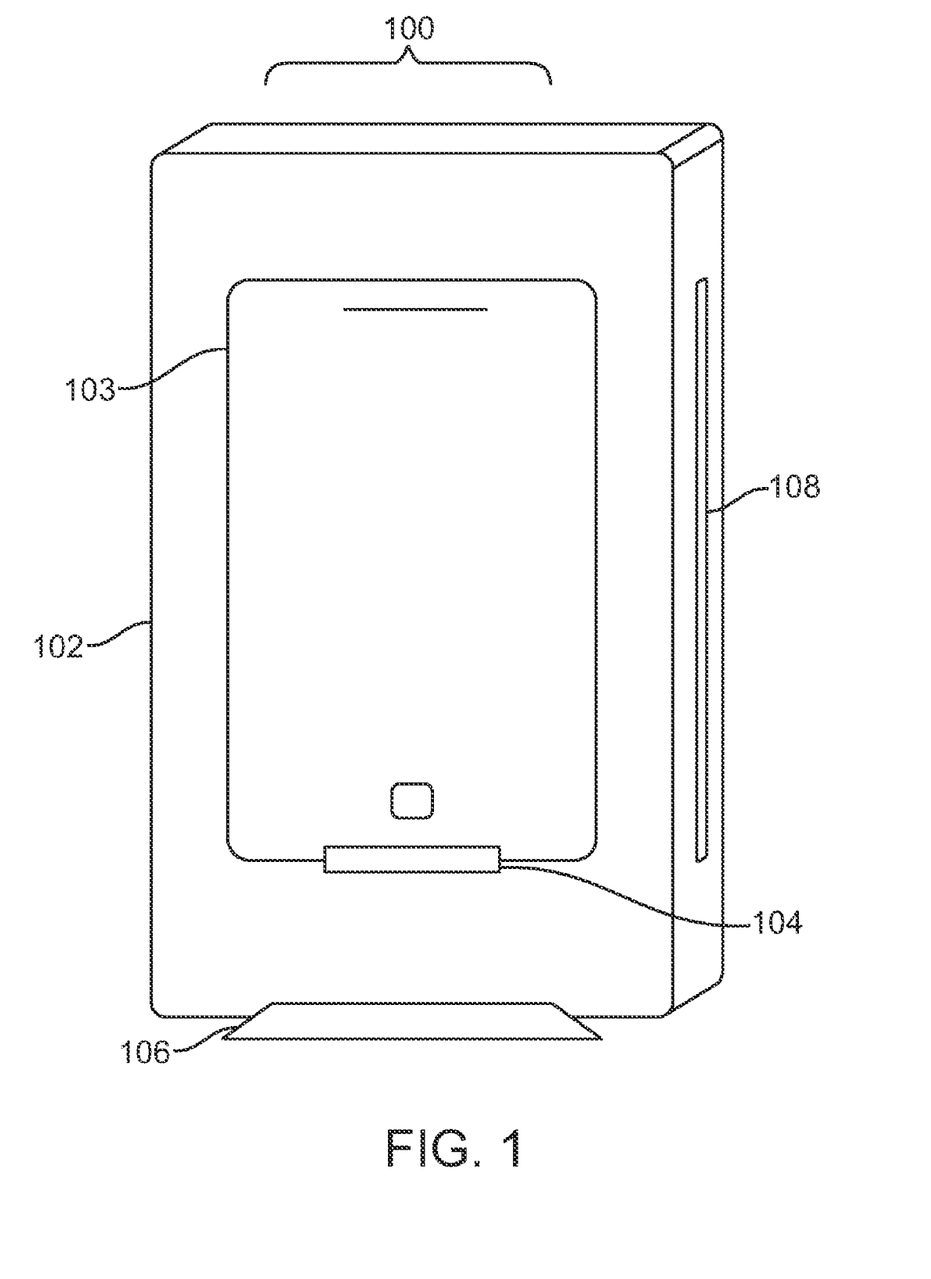
FIG. 1 is an exemplary schematic perspective view of a transportable point of sale device.

FIG. 1 illustrates an exemplary roaming point-of-sale system 100, which includes a scanning device 102 and a handheld computing device 103, which can fit into a cavity in the scanning device in a docking arrangement. As illustrated, the handheld computing device can be received in the cavity of the scanning device in such a configuration that gives the appearance that the system is one integral device.

The scanning device 102 includes a barcode scanner 106 and, in some embodiments, the scanning device can have a magnetic card reader 108, as illustrated. However, in other embodiments, the barcode scanner 106 and the magnetic card reader 108 can be physically distinct devices. As illustrated, the handheld computing device 103 and the scanning device 102 are in electrical communication via connector 104. The connector 104 can be any connection that is able to establish electrical communication between the scanning device 102 and the handheld computing device, but it is especially forseen as being an universal serial bus connector or a 30-pin connector such as is most commonly found on an IPOD TOUCH portable media-playing devices or an IPHONE smartphone, both of which are sold by Apple Inc. of Cupertino, Calif.

Figure 2:
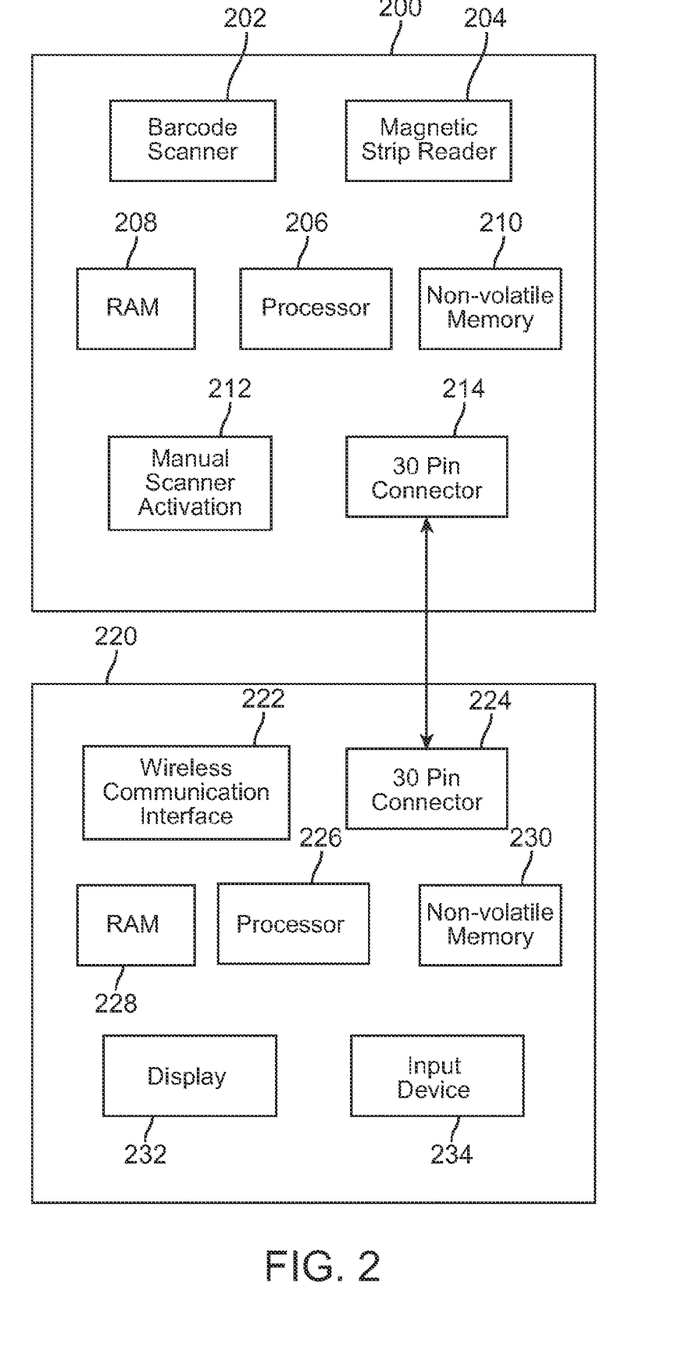
FIG. 2 is a schematic illustration of an exemplary point-of-sale system.

FIG. 2 schematically illustrates a roaming point-of-sale system, which includes a scanning device 200 and a handheld computing device component 220. The handheld computing device includes an input device 234, which is operable to receive an input from a sales associate using the input device 234. The input device can be a keypad and or pointing device, or, as in preferred embodiments, a touch sensitive display. The handheld computing device 220 also includes a processor 226. The processor 226 is configured to load and/or run a point-of-sale application, usually as a result of receiving an input from the input device 234.

The point-of-sale application can be loaded from a storage device 230, which can be any suitable non-volatile memory, into a RAM 228 for use by the processor 226. As directed by the point-of-sale application, the processor 226 sends a barcode-scan command to the scanning device 200 via the 30-pin connectors 214, 224.

Processor 206 receives the barcode-scan command, which is interpreted in the context of computer-executable instructions (firmware) already loaded in RAM 208. When not in use, the computer-executable instructions (firmware) are stored in non-volatile memory 210.

In response to the barcode-scan command, the barcode scanner 202 scans barcodes and processor 206 receives the scanned data and decodes the barcode information and sends the decoded data to the handheld computing device using the connector 214. In some embodiments, the barcode scanner can be manually activated by a manual scanner activation button 212, which also causes the scanning device to scan and decode the barcodes and send the decoded data to the handheld computing device. The data is received by the handheld computing device using its connector 224, which identifies the received code and sends it to RAM 228 for temporary storage in association with the sales application.

The sales application can also instruct the processor 226 to present on the display 232 the progress of the transaction. At this stage, the display can identify the product being purchased based on the scan information and can also prompt the sales associate to enter payment information.

The processor 226 can send a receive-payment instruction over connectors 224 and 214 to the scanner processor 206 in response to either a user-initiated instruction or an instruction given by the sales application. After receiving the receive-payment instruction, the processor 206 can interpret the instruction based on firmware and receive data from a magnetic strip reader 204. The magnetic strip reader 204 is used to accept credit card or bankcard data by reading the magnetic strip that is commonly located on the backs of such cards. The magnetic strip reader 204 passes the received data on to the processor 206, which sends the data back to the handheld computing device. The processor 226 receives the magnetic strip data and sends the data to RAM 228 for temporary storage in association with the sales program.

The transaction is completed by transmitting payment information to a payment clearinghouse and receiving a payment confirmation therefrom. The handheld communication device can transmit the payment information using the wireless communication interface 222, over a network, to the payment clearinghouse. After a payment confirmation is received from the payment clearinghouse, a record of the entire transaction including any product information, customer information, and payment information is completed and sent to an in-store server using the wireless communication interface 222.

In some embodiments, the roaming point-of-sale system utilizes a handheld computing device that is generally not manufactured specifically for use in connection with in the roaming point-of-sale system. Rather, the handheld computing device can be a more general purpose device with a sales application installed on it to allow the device to be used with the scanner that is specially designed for use in connection with in the roaming point-of-sale system. The handheld computing device suitably will have many other functions, e.g., as a mobile phone, as a portable media-playing device, as an email client, as a game-playing device, as a personal organizer, etc. However, because the handheld-computing device is not a specific purpose device, the scanner and handheld-computing device must be configured to electronically communicate with each other. A method or protocol for such communication is herein described.

Figure 3:
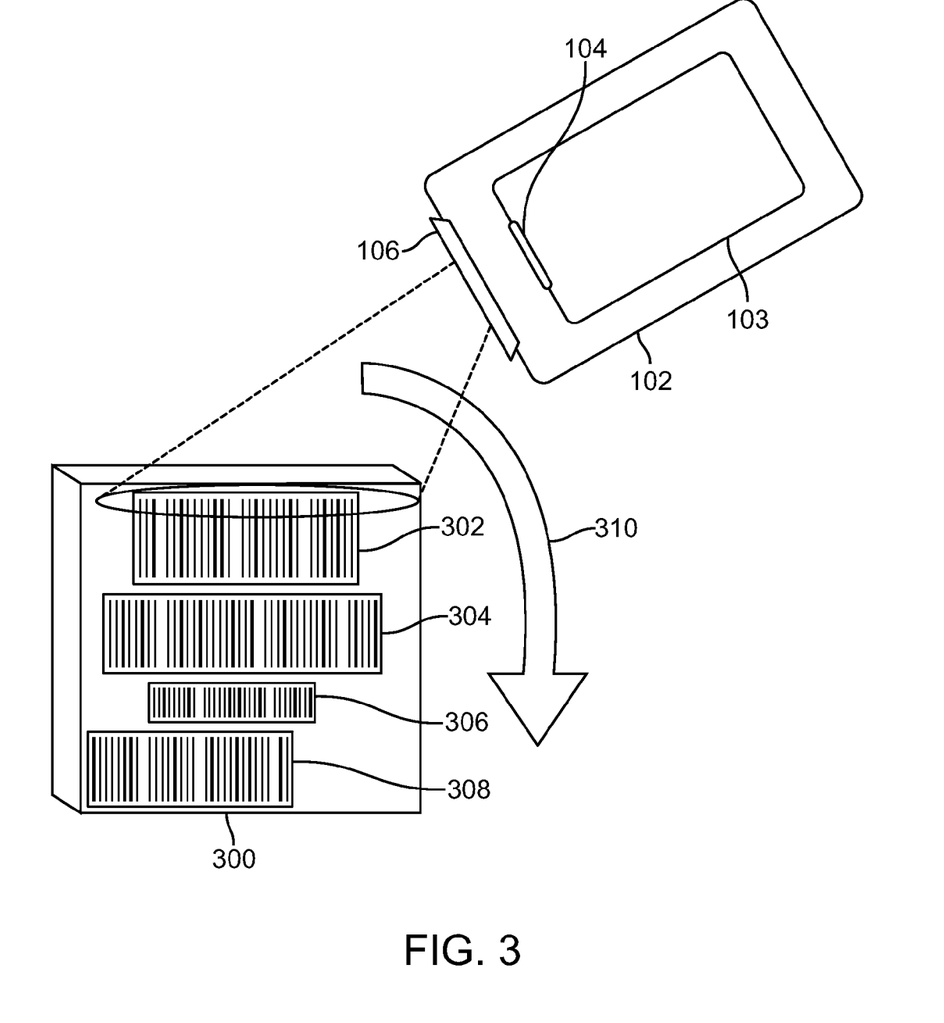
FIG. 3 illustrates an exemplary scanning operation.

As illustrated in FIG. 3, the illustrated device is particularly useful in a retail environment, wherein a sales associate can complete a sales transaction using the device. A product package 300 containing multiple barcodes representing different code types (302, 304, 306, 308) is illustrated. Barcode 302 represents the part number of the product or product code, barcode 304 represents the serial number of the product, barcode 306 represents the IMEI number of the product, and barcode 308 represents the ICCID number of the product. In some embodiments, each of the four codes can be encoded by different barcode symbologies.

As illustrated in FIG. 3 a scanner can scan every barcode on the package in one scanning or swiping motion or at least in a single scanning operation. In some embodiments, the scanning device can provide a tone or visual confirmation such as a flashing LED for each barcode scanned so that a sales associate can receive confirmation that the desired number of barcodes has been scanned. While in some embodiments, a computing device, such as the portable electronic device 103, can store and provide access to a form or database to be completed with information extracted from the barcodes and can also provide a tone or visual confirmation that the appropriate barcodes were scanned and the desired information was received into the form.

As a sales associate scans each barcode on the product, usually in one continuous motion, the scanner device 102 can scan all four barcodes 302, 304, 306, and 308 in one swipe as shown by arrow 310, even though the barcodes are not necessarily in the same, consistent symbology. Once the four barcodes 302, 304, 306, and 308 are scanned, software subsequently determines the symbology of each barcode, decodes the barcodes and passes the decoded data to a program for completing the sales transaction.

In preferred embodiments, the algorithm(s) required to recognize a given barcode symbology can be part of the scanning device itself. As is known in the art, some barcode scanners are programmed with such algorithms, which allow the scanner to recognize and decode many different barcode symbologies. However, in some embodiments, such capability can be programmed into the portable communication device.

Figure 4:
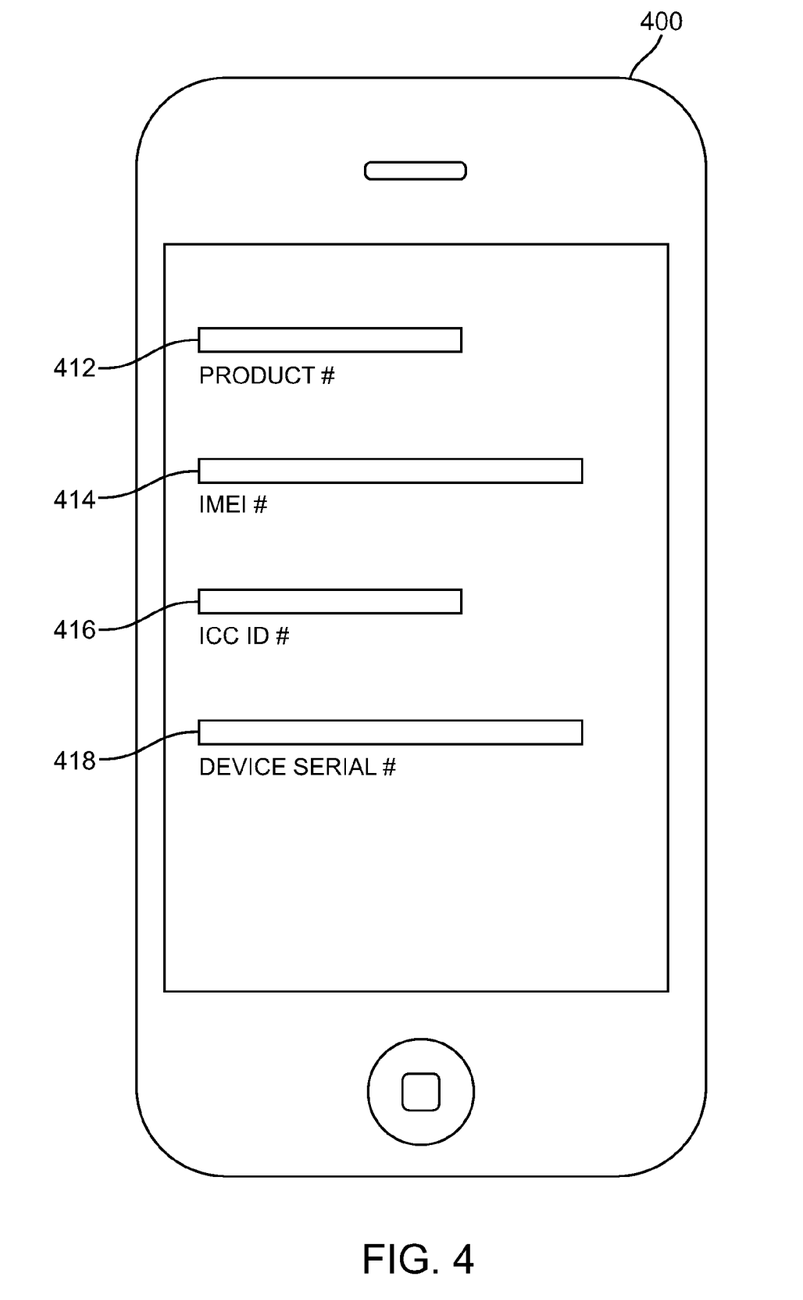
FIG. 4 illustrates an exemplary sales form that can be displayed on a handheld computing device.

FIG. 4 illustrates a handheld computing device 400, displaying an exemplary sales form screen. In some embodiments, the sales form can have more or less fields, which need not be simultaneously displayed. Further, the screen 410 illustrated in FIG. 4, can be skipped and not displayed if all information is automatically populated. The form can be automatically populated by receiving the necessary data from the scanning device and by processing the information by the sales application, which can recognize and distinguish the received codes and insert them into the sales form. As illustrated, the sales form 410 includes fields for a product code 412, IMEI number 414, ICCID number 416, and a device serial number 418.

Figure 5:
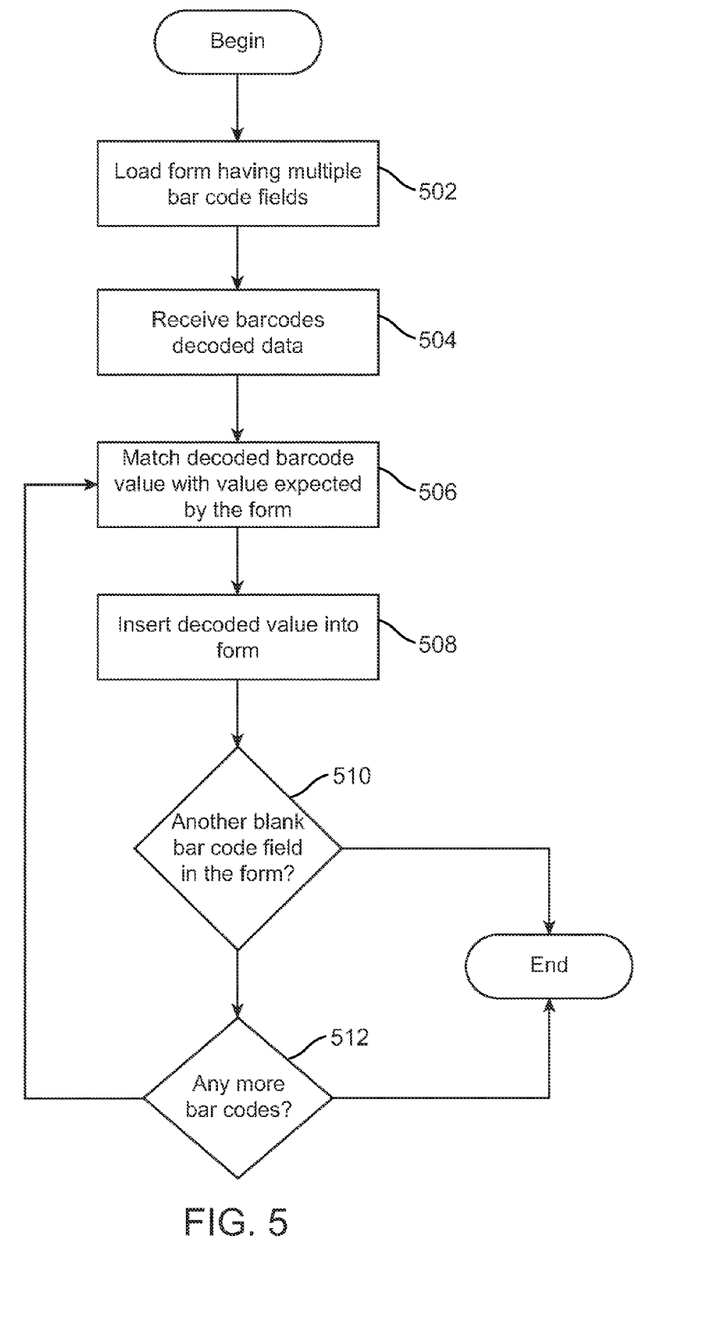
FIG. 5 illustrates an exemplary method embodiment for scanning multiple codes types and storing the codes in a sales form.

FIG. 5 illustrates an exemplary method of scanning multiple barcodes encoding values of different types and inserting information decoded therefrom into a sales form or database. At 502 a sales form or database having a plurality of fields is loaded into the portable communication device's memory. In one example, the sales form requires several fields to be completed with information represented by a plurality of barcodes.

A plurality of barcodes, each encoding a different type of code, are scanned by the scanning device. Ideally the full complement of barcodes can be successfully scanned in one scan, as illustrated in FIG. 3. However, in some instances one or more of the barcodes can be rescanned to complete the set.

As is known with respect to conventional multi-barcode scanners, each barcode can be analyzed for a symbology match, using pattern-matching techniques. The symbology match can be an iterative process by which a software routine compares a scanned barcode to an identified symbology. Once a symbology is recognized, the scanned barcode can be decoded. Alternatively, the routine can attempt to decode each barcode until a valid output is derived. Some barcodes encode alpha-numeric characters, others encode only alphabetical characters and some only encode numerical characters. By comparing these known characteristics of the different barcode types, barcodes can be recognized based on an attempted decoding step. Likewise, most barcodes include a checksum. If the checksum fails, the barcode was improperly decoded, and in this instance such an error is likely caused by failing to accurately recognize the barcode symbology. As can be appreciated, a variety of methods can be used to identify a barcode symbology.

In some embodiments, the scanner can learn of the symbology of the barcode it is expecting before scanning the barcodes. In such embodiments, the expected symbologies can be programmed or input into the scanner, and the scanner algorithm can compare the unknown barcodes with only the expected barcodes. While well upwards of 50 different barcode symbologies exist, processing resources can be conserved if the pattern matching software can be programmed to know the several expected barcode symbologies.

After the scanner decodes the barcodes, the data describing the decoded values can be received by the portable communication device (504).

In the example of a mobile telephone sale, the form can require a UPC code, device serial number, a IMEI code and a ICCID, as common examples. The portable communication device, which hosts the form, can analyze each decoded value received from the scanner to determine which of the decoded values is associated with each of the respective fields of the form (506). In the present example, each of the product code, serial number, IMEI code and the ICCID code are represented by values of a different number of characters. Accordingly, the routine can analyze one of the decoded values that was received from the scanner to determine the number of characters in the code and based on the number of characters the routine can determine which field of the form is associated with the value and insert the value into the form (508).

The routine can next determine if there is another blank field in the form (510) and if any more decoded barcode values are remaining to be analyzed (512). If it is determined that all fields are completed or that there are no more decoded barcode values to analyze, the routine ends. However, if the opposite is true, and there are additional decoded barcode values to analyze and blank fields remain to be completed by the routine, the method can return to 506 and the next value can be identified, and entered into the form (508).

Some product packaging can have more barcodes than are required by the sales form. In such instances, unrecognized values can simply be discarded and the next value processed until the routine completes by analyzing all of the barcodes or completing the form.

Bar codes can be processed one at a time as illustrated in FIG. 5, or they can be processed concurrently.

In some embodiments, if the method completes without satisfying every field in the form that requires barcode information, a message can be generated to inform an operator of the missing information. In such instances, the operator can attempt to rescan the collection of barcodes, or just the required barcode, or the operator can type in the information, as in the instance of a poorly printed barcode.

As can be appreciated, the above-described method can greatly simplify a sales transaction for a device having multiple barcodes. Using the present technology, a sales associate can quickly scan several barcodes, which will be processed by the system, and automatically advance to processing payment and completing the transaction. This is in contrast to prior art technologies which present a form to a sales associate and require one barcode to be scanned at a time.

Figure 6:
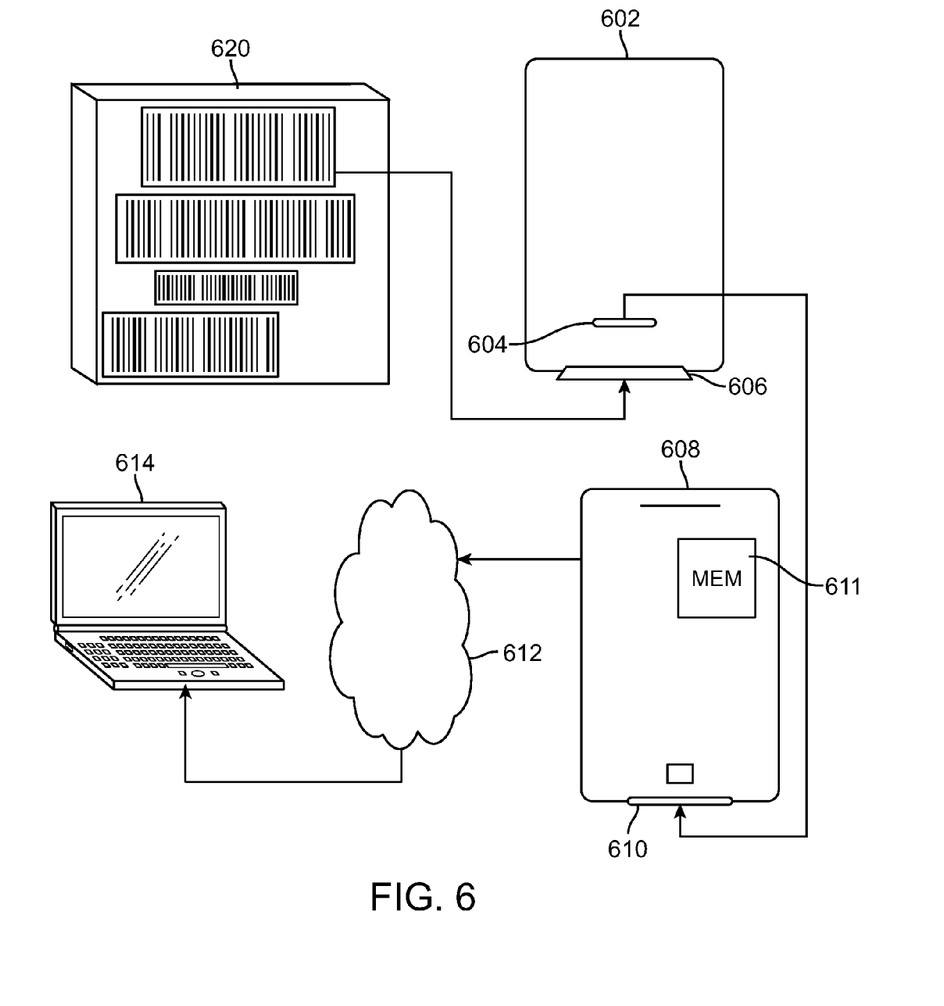
FIG. 6 illustrates an exemplary path of data extracted from barcodes to arrive at the sales form.

FIG. 6 represents a schematic system diagram illustrating the path the data can take from the encoded data tags in product 620 to the destination software storage location. In some embodiments, the decoded data bits are delivered to the scanner device 602 via the optical scanner 606. The scanner device 602 can decode the barcode and send data bits describing the value that resulted from the decoding to the memory of the portable electronic device 608 via the complementary electrical connectors 604 and 610 for temporary storage in memory 611. The portable electronic device 608 can further process the data to recognize each value as representing an expected value format and populate a sale transaction form. The portable electronic device can also be used to receive payment information and complete the transaction. After the transaction is complete, or at various stages of the transaction, the portable electronic device can send the transaction information to a server 614 using network 612.

In some embodiments the portable electronic device 608 can send the decoded data to a computer system or server 614 via a network 612 to populate the sales form with the desired values.

Figure 7:
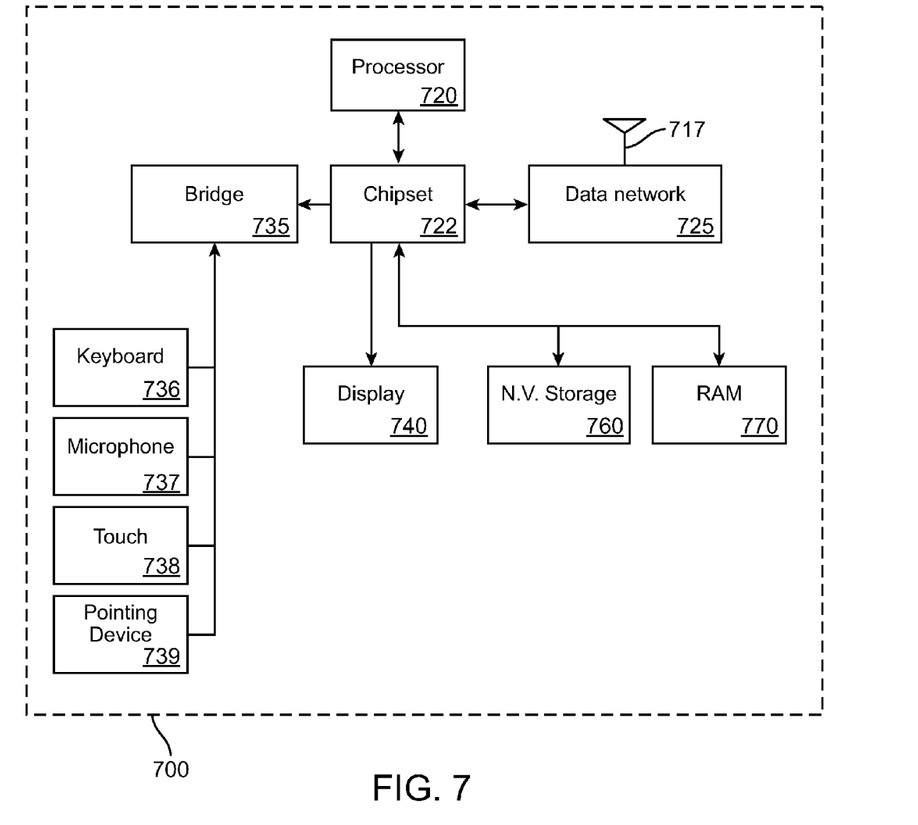
FIG. 7 is a schematic illustration of an exemplary system embodiment of the handheld computing device and/or the scanning device.

FIG. 7 illustrates a computer system 700 used in receiving data representing code types, processing the code types, and entering the data into a sales form. Computer system 700 is an example of computer hardware, software, and firmware that can be used to implement disclosures below. System 700 includes a processor 720, representative of any number of physically and/or logically distinct resources capable of executing software, firmware, and hardware configured to perform identified computations. Processor 720 communicates with a chipset 722 that can control input to and output from processor 720. In this example, chipset 722 outputs information to display 740, and can read and write information to non-volatile storage 760, which can include magnetic media, and solid state media, for example. Chipset 722 also can read data from and write data to RAM 770. A bridge 735 for interfacing with a variety of user interface components can be provided for interfacing with chipset 722. Such user interface components can include a keyboard 736, a microphone 737, touch detection and processing circuitry 738, a pointing device, such as a mouse 739, and so on. In general, inputs to system 700 can come from any of a variety of sources, machine generated and/or human generated.

Chipset 722 also can interface with one or more data network interfaces 725 that can have different physical interfaces 717. Such data network interfaces can include interfaces for wired and wireless local area networks, for broadband wireless networks, as well as personal area networks. Some applications of the methods for generating and displaying and using the GUI disclosed herein can include receiving ordered datasets over physical interface 717 or be generated by the machine itself by processor 720 analyzing data stored in memory 760 or 770. Further, the machine can receive inputs from a user via devices 736, 737, 738, 739 and execute appropriate functions, such as browsing functions by interpreting these inputs using processor 720.

Methods according to the above-described examples can be implemented using computer-executable instructions that are stored or otherwise available from computer readable media. Such instructions comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality also can be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer implemented method comprising:
receiving data decoded from a plurality of barcodes, the plurality of barcodes having been scanned during a single continuous scanning operation;
identifying a unique type for each of a plurality of received data from the plurality of barcodes, wherein its unique type is identified by determining a unique character length for each of the plurality of received data; and
populating a plurality of fields in a fillable form with the plurality of received corresponding received data decoded from a scanned barcode in accordance with its identified unique type.

2. The method of claim 1, further comprising discarding barcode information for which no field is reserved in the fillable form.

3. The method of claim 1, wherein the fillable form is a database.

4. The method of claim 1, wherein the fillable form is a form associated with a sales transaction.

5. The method of claim 1, wherein the unique type is identified using a pattern matching technique.

6. The method of claim 1, wherein the plurality of barcodes are four barcodes.

7. The computer implemented method of claim 1, further comprising detecting at least one unpopulated field in the fillable form and presenting the fillable form on a graphical user interface to allow manual entry of data for the at least one unpopulated field.

8. The computer implemented method of claim 7, wherein only the at least one unpopulated field is presented to allow manual entry.

9. The computer implemented method of claim 1, wherein the unique type is selected from the group consisting of: a UPC, IMEI, ICCID, and device serial number.

10. The computer implemented method of claim 1, wherein the plurality of barcodes are associated with a product for purchase.

11. A system comprising:
a scanner configured to receive barcode data of a plurality of barcodes in a single continuous scanning operation;
a processor configured to:
identify a unique type for each of a plurality of received barcode data from said plurality of barcodes, wherein the unique type is identified by determining a unique character length for each of said plurality of received barcode data, and
populating a plurality of fields in a fillable form with the plurality of received barcode data according to the identified unique type of each of the plurality of received barcode data.

12. The system of claim 11, further comprising:
a handheld computing device, the processor being part of the handheld computing device.

13. The system of claim 11, further comprising:
a handheld computing device, the handheld computing device configured to host the fillable form.

14. The system of claim 11, further comprising:
a server in networked communication with the processor, the server configured to host the fillable form.

15. The system of claim 11, wherein the processor is further configured to detect an unpopulated field in the fillable form and display a graphical user interface configured to present the unpopulated field in the fillable form for manual entry.

16. The system of claim 11, wherein the unique type is selected from the group consisting of: a UPC, IMEI, ICCID, and device serial number.

17. A product comprising:
a machine-readable medium; and
machine-executable instructions for causing a computer to perform the method comprising:
scanning a plurality of barcodes in a single continuous scanning operation;
decoding the scanned plurality of barcodes into a plurality of received barcode data;
identifying a unique code type for each of said plurality of received barcode data, wherein the unique code type is identified by determining a unique character length for each of said plurality of received barcode data; and
populating each of a plurality of fields in a fillable form with corresponding received barcode data decoded from a scanned barcode, wherein the form is populated in accordance with the identified unique code type.

18. The product of claim 17, wherein the unique code type is selected from the group consisting of: a UPC, a IMEI, a ICCID, and a device serial number.

19. The product of claim 17, further comprising:
generating an audible tone as each of the plurality of barcodes is scanned.

20. The product of claim 17, further comprising:
detecting at least one unpopulated field in the fillable form and presenting the at least one unpopulated field on a graphical user interface to allow manual entry of data for the at least one unpopulated field.

21. A method of conducting a retail sales transaction wherein a product to be sold requires scanning of multiple barcodes comprising:
operating a scanning device to read multiple barcodes in a single continuous pass of the scanning device;
decoding each of the multiple barcodes into a decoded barcode data;
identifying a unique type for each of the decoded barcode data, wherein the unique type is identified by determining a unique character length for each of the decoded barcode data, wherein the unique character length is different for each unique type; and
automatically populating each of a plurality of fields in a fillable sales form with the decoded barcode data decoded from each barcode read in accordance with the identified unique type of the decoded barcode data.

* * * * *